(12) United States Patent
Fields et al.

(10) Patent No.: US 11,498,884 B2
(45) Date of Patent: Nov. 15, 2022

(54) SYSTEM FOR RESOURCE RECOVERY FROM POULTRY PROCESSING WASTEWATER

(71) Applicant: Besser Tech Holdings LLC, Fairfield, NJ (US)

(72) Inventors: William Michael Fields, Highlands Ranch, CO (US); Yuanchun Xu, Highlands Ranch, CO (US); Guichun Zhang, Highlands Ranch, CO (US)

(73) Assignee: Besser Tech Holdings LLC, Fairfield, NJ (US)

( * ) Notice: Subject to any disclaimer, the term of this patent is extended or adjusted under 35 U.S.C. 154(b) by 197 days.

(21) Appl. No.: 16/639,928

(22) PCT Filed: Aug. 17, 2018

(86) PCT No.: PCT/US2018/000282
§ 371 (c)(1),
(2) Date: Feb. 18, 2020

(87) PCT Pub. No.: WO2019/035999
PCT Pub. Date: Feb. 21, 2019

(65) Prior Publication Data
US 2020/0239330 A1 Jul. 30, 2020

Related U.S. Application Data

(60) Provisional application No. 62/547,428, filed on Aug. 18, 2017.

(51) Int. Cl.
*C02F 1/24* (2006.01)
*C02F 1/40* (2006.01)
(Continued)

(52) U.S. Cl.
CPC .............. *C05F 1/005* (2013.01); *A23K 10/26* (2016.05); *A23K 20/158* (2016.05); *C02F 1/24* (2013.01);
(Continued)

(58) Field of Classification Search
CPC ...... C02F 1/24; C02F 9/00; C02F 1/40; C02F 3/121; B03D 1/1431; B03D 1/02;
(Continued)

(56) References Cited

U.S. PATENT DOCUMENTS 1,323,373 A * 12/1919 Myers ...................... B03D 1/24
209/170
2003/0201225 A1 10/2003 Josse et al.

FOREIGN PATENT DOCUMENTS

| EP | 1357087 | 10/2003 |
|---|---|---|
| WO | WO9505346 | 2/1995 |
| WO | WO2012065250 | 5/2012 |

OTHER PUBLICATIONS

The PCT Search Report and Written Opinion dated Dec. 14, 2018 for PCT Application No. PCT/US2018/000282, 11 pages.

* cited by examiner

*Primary Examiner* — Claire A Norris
(74) *Attorney, Agent, or Firm* — Wei Wei Jeang; Grable Martin Fulton PLLC

(57) ABSTRACT

A system for recovering fat, oil and grease (FOG) from wastewater has multiple annular flotation zones in a concentric configuration surrounding a central column to create progressively increasing surface areas for FOG and solid particles flotation. Each flotation zone may be equipped with an independent pressurized micro air and/or ozone bubbles distribution system. The FOG is recovered in the first flotation zone without chemical additions. Coagulant and flocculant may be added in the second flotation zone to
(Continued)

maximize removals of biochemical oxygen demand (BOD), total suspended solids (TSS), and colloidal particulates and produce clear effluent. Magnesium chloride is added in the third flotation zone to remove phosphorus and to form struvite particulates that can be used as fertilizer. Since both organic loading and solid loading in the treated effluent are significantly reduced, poultry processing plants can more easily meet wastewater treatment plant discharge limits and avoid surcharges.

20 Claims, 10 Drawing Sheets

(51) Int. Cl.
*C02F 1/52* (2006.01)
*C02F 11/127* (2019.01)
*C05F 1/00* (2006.01)
*A23K 20/158* (2016.01)
*A23K 10/26* (2016.01)
*C02F 101/32* (2006.01)
*C02F 103/22* (2006.01)
*C02F 103/32* (2006.01)

(52) U.S. Cl.
CPC .............. *C02F 1/40* (2013.01); *C02F 1/5254* (2013.01); *C02F 11/127* (2013.01); *C02F 2101/32* (2013.01); *C02F 2103/22* (2013.01); *C02F 2103/32* (2013.01)

(58) Field of Classification Search
CPC ................ B01D 17/0205; B01D 21/06; B01D 21/2438; B01D 21/0027; B01D 21/14; B01D 21/20; B01D 21/24; A23K 20/158; A23K 10/26
See application file for complete search history.

```
                    1000 ─┐
                          ↘

┌─────────────────────────────────────────────────────────────────────┐
    │  TRANSFER THE STRUVITE SCUM AND SLUDGE TO A THREE-PHASE CENTRIFUGE  │
    │                              DECANTER                                │
    │                                1002                                  │
    └─────────────────────────────────────────────────────────────────────┘
                                      │
                                      ▼
    ┌─────────────────────────────────────────────────────────────────────┐
    │  PROCESS THE STRUVITE SCUM AND SLUDGE BY THE THREE-PHASE CENTRIFUGE │
    │             DECANTER TO SEPARATE OIL, LIQUID, AND SOLIDS            │
    │                                1004                                  │
    └─────────────────────────────────────────────────────────────────────┘
                                      │
                                      ▼
    ┌─────────────────────────────────────────────────────────────────────┐
    │  TRANSFER THE SOLIDS TO A ROTARY DRUM GRANULATOR TO PRODUCE SLOW-   │
    │              RELEASE GRANULAR STRUVITE FERTILIZER                    │
    │                                1006                                  │
    └─────────────────────────────────────────────────────────────────────┘
```

FIG. 10

SYSTEM FOR RESOURCE RECOVERY FROM POULTRY PROCESSING WASTEWATER

CROSS-REFERENCE TO RELATED APPLICATION(S)

This application is a U.S. national stage application under 35 USC § 371 of International Application No. PCT/US18/00282 filed on Aug. 17, 2018 and entitled "SYSTEM FOR RESOURCE RECOVERY FROM POULTRY PROCESSING WASTEWATER," which claims priority to U.S. Provisional Application No. 62/547,428 filed on Aug. 18, 2017 and entitled "RESOURCE RECOVERY SYSTEM FROM POULTRY, BEEF, PORK, AND LAMP PROCESSING WASTEWATER," the entire contents of which are incorporated herein by reference.

BACKGROUND

Wastewater containing fat, oil, and grease (FOG) is usually generated from animal killing and meat processing, food processing, trap grease in restaurants, and flowback and produced water in oil and gas exploration and production. When the wastewater is discharged either a city sewer, leachate land, aeration pond, or lagoon, FOG can cause: (1) plugging of private lateral sewer lines; (2) blockage of sanitary sewer lines; (3) sewage overflow, spill, and backup to households; clogging of soil pores and leachate fields; (4) an anaerobic condition in sewers and odor issues; (5) the introduction of high-strength organic matter to downstream city wastewater treatment plants (WWTP); and (6) increased operation and maintenance cost of (WWTP).

In general, wastewater containing FOG is usually produced as a result of animal or meat processing, food processing (such as in a restaurant grease trap), and oil and gas exploration and production (e.g., as part of flowback and produced water). In some instances, plants or facilities have installed dissolved air flotation (DAF) units. However, conventional DAF units commonly have low FOG recovery and removal efficiency.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 10 illustrates an example flow diagram showing a process for forming struvite fertilizer according to some implementations.

DETAILED DESCRIPTION

Figure 1:
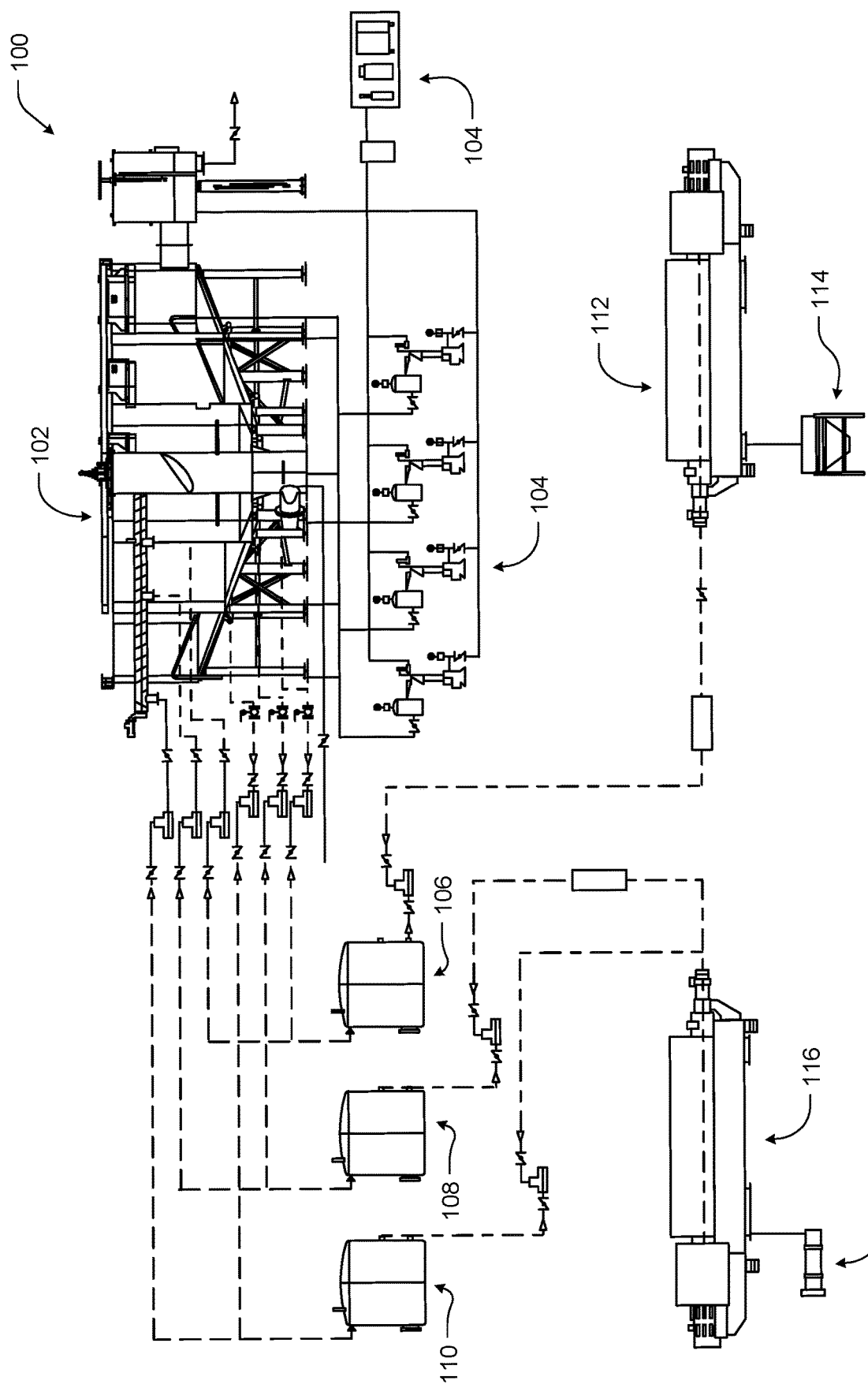
FIG. 1 illustrates a cross-sectional view of an example resource recovery system for processing wastewater according to some implementations.

This disclosure includes techniques and implementations for cleaning and recovering fat, oil, and grease (FOG) from wastewater. In particular, the system discussed herein is configured to remove and recover organic matter from wastewater produced as part of poultry processing. For instance, the system may be used for recovering and/or producing useful byproducts of the poultry processing, such as yellow grease, biodiesel feedstocks, or fertilizer and animal feed, from the poultry processing wastewater. In some cases, poultry processing wastewater primarily originates from bird killing, bleed-out, scalding, evisceration, chilling, cutting, and packaging steps of the poultry processes. In some cases, additional poultry processing wastewater may result from processing plant cleanup. In some cases, poultry process wastewater contains uncollected blood, feathers, viscera, dirt, and other particulates introduced from the live haul area washing.

Conventionally, poultry processing plants have installed rotary screens, such as a primary rotary screen and a secondary rotary screen to remove, filter, and recover feathers, heads, viscera, and particulates larger than 500 microns from the poultry processing wastewater. However, effluent that has been passed through or processed by the conventional rotary screens often still contains significant amounts of FOG, chicken particulates, biochemical oxygen demand (BOD), total suspended solids (TSS), total nitrogen (TN), and total phosphorus (TP) that is either removed via further processing or acts as pollutants to the environment. For instance, the rotary screen effluent may be directly discharged into the city sewer. In these instances, the downstream wastewater treatment plant (WWTP) is stressed. In some cases, the WWTP may implement surcharges, when the high-strength industrial wastewater discharges have BOD and TSS amounts that exceed average domestic wastewater levels, thus, increasing the operating costs of the poultry processing plants. Alternatively, conventional poultry processing plants discharge the rotary screen effluent into a lagoon and/or aeration pond, which causes adverse environmental impacts due to the high FOG, BOD, and TSS loadings. For example, the rotary screen effluent has been known to cause difficulties in dredging settled solids at lagoon or pond bottoms, pipeline plugging, and anaerobic conditions that can produce rotten odors.

In general, processing one bird typically generates about seven gallons of poultry processing wastewater. Based on USDA data, nine billion broiler chickens were processed in 2015. The annual poultry processing wastewater production rate is estimated at 63 billion per year, or 242 million gallons per day (mgd) at 260 processing days per year. After rotary screening, typical poultry processing wastewater still contains about 3,000 mg/L BOD, 2,000 mg/L TSS, 500 mg/L FOG, 150 mg/L TN, and 18.5 mg/L TP. This represents recoverable and/or removable FOG/TN/TP amounts of as much as 505 tons/d, 152 tons/d, and 18 tons/d, respectively. Thus, the system discussed herein can reduce poultry processing wastewater discharge into lagoon/pounds or the city sewers, thereby reducing negative environmental impacts of the poultry processing industry, the system is able to recover valuable resources that are used to produce valuable commodities, such as yellow grease, animal food, fertilizer (such as slow-release phosphorus fertilizers), biodiesel, and feedstocks.

In some implementations, the poultry wastewater processing system discussed herein provides an integrated, compact, and modular system for reducing BOD and TSS pollutants resulting from the poultry processing industry, as well as by other animal killing, food processing, and/or meat processing facilities, trap grease produced in restaurants, and flowback and produced water in oil and gas exploration and production industry.

Discussed below are implementations of a resource recovery system that includes a circular zoned dissolved air and/or ozone flotation (CZDAOF), a three-phase centrifuge decanter, a solid blending system, a rotary drum granulator, and other accessories. In general, the CZDAOF unit is a flow-through wastewater treatment system having a central inlet column, a series of three independent flotation zones in a concentric arrangement about the central inlet column to create progressively increased surface areas for flotation of FOG and solid particles to enhance FOG recovery, and an effluent adjustable weir box in fluid communication with each other. Thus, the resource recovery system addresses many of shortcomings in conventual poultry processing wastewater management. For instance, the proceeds from the recovered resources allow for rapid recovery of the investment required to produce the systems, and the operations of the resource recovery system provide substantial benefits and contributions to the environment, society, and poultry industry.

In various implementations, either or both air and/or ozone may be pressurized and dissolved in the recirculated effluent. The recirculated effluent may then be re-introduced into the flotation zones of the CZDAOF unit to cause micron size fine bubbles to attach to and float FOG and other particulates in the wastewater to the surface where the FOG and other particulates may be collected.

In some examples, the CZDAOF unit may be have three or more distinct flotation zones for introducing the micron size fine bubbles of air and/or ozone into the wastewater as well as other chemicals to treat the wastewater before discharge from the system. For instance, the flotation zones may include up to three or more concentric rings around the central inlet column. In some cases, in order to avoid cross-contamination with recovered FOG, the system may be configured to ensure that no chemicals are added to the wastewater within the first flotation zone. The uncontaminated FOG and chicken particulates floated on the surface of the first flotation zone and bottom sludge collected on the bottom of the first flotation zone may be discharged.

In some implementations, the system may introduce coagulants and flocculants into the wastewater in the second flotation zone to enhance the BOD and TSS removal. For example, by adjusting and altering the amount of chemical additions in the form of the coagulants and flocculants, the BOD in the effluent discharged by the system can be reduced by as much as 50-60 percent and the TSS in the effluent discharged by the system may be reduced by as much as 90-95 percent. Scum and bottom sludge on the bottom of the second flotation zone are collected and stored in designated chemical contaminated sludge holding tanks.

Following the enhance removals of the BOD and the TSS from the wastewater in the second flotation zone, the wastewater stream entering the third flotation zone is clearer and cleaner. In the third flotation zone, the system may introduce magnesium chloride to the wastewater to precipitate phosphorus and to produce struvite, that is not soluble in water and, thus, may be collected. The collected struvite may then be used or sold as a slow-release fertilizer. For example, the phosphorus and nitrogen nutrients within can be released over a period of time under the controlled moisture, temperature, and pH conditions. This feature increases nutrient utilization efficiency and reduces the phosphorus run-off risks associated with the struvite fertilizer. In addition, struvite fertilizer production from poultry processing wastewater provides an alternate source for the product to the limited phosphate rock reserves in environments.

The recovered FOG can be further processed using the three-phase centrifuge decanter to produce yellow grease. Since ozone is introduced in FOG recovery process in the first flotation zone, the yellow grease generated from three-phase centrifuge decanter using the ozone attached FOGs is storable at room temperature for long periods of time without deterioration. As discussed above, yellow grease is a valuable commodity and can be used to manufacture soap, make-up, paint, rubber, and detergents. In some cases, the dry cake may also be produced from the three-phase centrifuge decanter. The dry cake contains up to 20% protein and may be blended with potato processing waste to manufacture high-energy livestock feed and other animal foods. In some cases, the blending the yellow grease with the potato processing waste results in a product that meets the quality standards applicable for human food consumption. For example, potato processing waste contains about 42.2 percent carbon and the potato processing waste is excellent energy source for ruminant animals. Various kinds of animal foods can be made by blending carbon-rich potato process waste with protein-rich poultry FOG recovery waste, including the yellow grease.

Scum and bottom sludge collected from the second flotation zone often contains residual FOG. The scum and bottom sludge may be dewatered by a three-phase centrifuge decanter. Since coagulant and flocculant are added to enhance the BOD and TSS removal, the oil generated by this three-phase centrifuge decanter from the scum and bottom sludge collected from the second flotation zone can be stored and used as biodiesel feedstocks, and the dry solids can be used as ordinary fertilizer. The scum and bottom sludge in the third flotation zone is collected and transferred to one or more struvite sludge tank. Again, a three-phase centrifuge decanter can be used to dewater the struvite slurry and a rotary drum granulator can then be used to produce the struvite particulates for the fertilizer.

In one particular implementation, an integrated resource recovery system to initially recover FOG without chemical additions, to then enhance removal of BOD and TSS with coagulant and flocculant additions, and finally to precipitate phosphorus with magnesium chloride, from screened poultry processing wastewater is discussed below. The concentrations of FOG and other contaminants in the treated effluent produced by the integrated resource recovery system are sufficiently low to avoid surcharges by downstream municipal WWTPs for high-strength industry wastewater. The reduced BOD and TSS loadings also significantly reduce environment impacts and may cut operation costs if the treated effluent is discharged into a receiving aerated lagoon and pond. In some cases, byproducts from the resource recovery system include valuable yellow grease, livestock feed, animal foods, biodiesel feedstocks, and slow-release fertilizer.

In some implementations, the resource recovery system is configured to maximize recovery of commercial viable resources from poultry processing wastewater and significantly reducing BOD and TSS loadings in the treated effluent. The major functions of the resource recovery system include FOG recovery without chemical addition, enhanced BOD and TSS removals, byproducts productions of yellow grease, biodiesel feedstocks, livestock feed and animal food, fertilizer, and slow-release struvite phosphate fertilizer. The treated effluent can be discharged into an existing city sewer, lagoon or pond with reduced environmental impact when compared with effluent cleaned using conventional systems or techniques.

FIG. 1 illustrates a cross-sectional view of an example resource recovery system 100 for processing wastewater according to some implementations. In the illustrated example, the resource recovery system includes at least a CZDAOF unit 102, gaseous material dissolving system 104, recovered FOG tank 106, sludge holding tank 108, struvite slurry tank 110, FOG processing three-phase centrifuge decanter 112, livestock feed and animal foods blending system 114, sludge processing and struvite dewatering three-phase centrifuge decanter 116, and struvite rotary drum granulator 118.

In the illustrate example, the CZDAOF unit 102 includes a central inlet column and multiple flotation zones that are arranged in concentric series around the central inlet column. In some cases, the system may be configured with annular flotation zones that have a conical shaped or sloped exterior/bottom wall(s). For example, the depth of each of the consecutive flotation zone may be reduced to allow for the waste sludge to be collected via one or more bottom sludge discharge ports. In some cases, each of the flotation zones as well as the central entry column may include independent pressured dissolved air diffusers that introduce microbubbles into the wastewater. The microbubbles attach on the surface of FOG or suspended solid particles within the wastewater. The attached microbubbles then cause the FOGs or particles to float upward where the FOGs or particles may be extracted from the wastewater. In some cases, different type of microbubbles may be introduced in different flotation zones by various independent diffusers and pumps. For example, a first flotation zone may introduce ozone, oxygen, and/or a combination thereof; a second flotation zone may introduce coagulant and flocculant to maximize removal of biochemical oxygen demand, total suspended solids, and colloidal particulates; and a third flotation zone may be used to introduce magnesium chloride to remove phosphorus and to form struvite particulates that can be used as fertilizer. In some cases, the flow direction of the wastewater is reversed in each successive flotation zone. This counter-current flow pattern (known as a "plug flow pattern") slows the rate of travel of the wastewater through the system, increased exposure of the wastewater to the flotation zones, thereby increasing chances for FOG to attach to the microbubbles and be removed by the scrum scraper assembly.

The gaseous material dissolving system 104 may be in fluid communication with an effluent weir tank such that the gaseous material dissolving system 104 may receive at least a portion of the effluent produced by the system 100. The gaseous material dissolving system 104 may include a number of pumps to dissolve the microbubbles into the effluent.

The recovered FOG tank 106, the sludge holding tank 108, and the struvite slurry tank 110 may be configured to store byproducts produced by the resource recovery system 100 when cleaning poultry processing wastewater. For example, as no chemicals are added in the first flotation zone the purity and quality of recovered poultry FOG is maintained. Thus, the recovered FOG tank 106 may be in communication with the first flotation zone such that the chicken parts and particulates that settle to the bottom of first flotation zone are discharged through a bottom sludge discharge assembly and transferred to the recovered FOG tank 106 by, for example, a pump. Additionally, the dissolved air and/or ozone introduced into the wastewater produces microbubbles within the first flotation zone that may attach to the FOGs in the wastewater. Thus, either due to the attached microbubbles or due to the lower density of the FOGs themselves, the FOGS tend to buoy up to the surface. The FOGS may then be collected by a scum scraper and collection trough and move to the recovered FOG tank 106.

In another example, the sludge holding tank 108 may be in communication with the second foliation zone of the CZDAOF unit 102. As in the second flotation zone, coagulant and flocculant are introduced to the wastewater, the remaining FOG and colloidal particulates may be further agglomerated and flocculated to form larger particulates. Substantial numbers of particulate and colloidal organic matter and suspended solids may then be removed within the second flotation zone. The floating scum in the second flotation zone may be transferred into the sludge holding tank 108 by, for example, a transfer pump. The heavier solids may settle to the bottom of second flotation zone, and thus may be discharged through a bottom sludge discharge assembly before being transferred to the sludge holding tank 108, again for instance, via a pump.

In some cases, the third flotation zone may be in fluid communication with the struvite slurry tank 110. For instance, in some implementations, in the third flotation zone, magnesium chloride may be added to precipitate phosphorus and form struvite (MgNH4PO4.6H2O) particulates within the wastewater. In addition to the magnesium chloride, dissolved air and/or ozone may be evenly distributed in the third flotation zone through a series of diffusers. Microbubbles formed from the dissolved air and/or ozone being exposed to the atmosphere within the third flotation zone, may cause the struvite particulates to float to the top surface where the struvite particulates may be collected and transferred into the struvite slurry tank 110 by, for instance, a transfer pump. As discussed above with respect to the other flotation zones, heavier solids may settle to the bottom of third flotation zone and may be discharged through a bottom sludge discharge assembly and transferred to the struvite slurry tank 110 by a pump.

In the illustrated example, the FOG processing three-phase centrifuge decanter 112 may be in fluid communication with the recovered FOG tank 106. In this example, the recovered FOG and particulates from the first flotation zone are preheated in recovered FOG tank 106. A pump may then transfer the heated FOG and particulates through a constant flow steam heater. Steam is injected to further heat the FOG and small particulates to a desired operation temperature or temperature range. Heated FOG and small particulates flow into a three-phase centrifuge decanter 112 for oil, liquid, and solid separations. The recovered oil from the three-phase centrifuge decanter 112 can be reserved or sold for yellow grease production. It has been found that the yellow grease in the present invention can be reserved for much longer period at room temperature without any deterioration. In some cases, dry solids resulting from the centrifuge decanter 112 may contain up to 20.7% protein. In one implementation, the dry solids may be blended with potato dry waste in the stock feed and animal foods blending system 114 to manufacture livestock feed and other animal foods from the yellow grease.

The sludge processing and struvite dewatering three-phase centrifuge decanter 116 may be in fluid communication with either or both of the sludge holding tank 108 and/or the struvite slurry tank 110. For example, the three-phase centrifuge decanter 116 can be run on a batch basis for both sludge dewatering and/or struvite slurry dewatering. For instance, the sludge processing and struvite dewatering three-phase centrifuge decanter 116 may during a first period of time process the outputs of the sludge holding tank 108 to produce biodiesel feedstock and the sludge processing and struvite dewatering three-phase centrifuge decanter 116 may during a second period of time process the outputs of the struvite slurry tank 110 to produce organic fertilizer for agriculture. It should be understood, that the time associated with each batch may vary as well as the number of batches produced for each tank 108 and 110. For instance, the sludge processing and struvite dewatering three-phase centrifuge decanter 116 may run two or three batches from the sludge holding tank 108 prior to preforming one batch from the struvite slurry tank 110 (or vice versa). In one particular alternative embodiment, two different three-phase centrifuge decanters may be used in lieu of the shared sludge processing and struvite dewatering three-phase centrifuge decanter 116 shown in FIG. 1.

In some cases, both FOG floating scum and bottom sludge from the second flotation zone are preheated in a sludge holding tank 108 and are transferred by, for instance, a pump through a constant-flow steam heater prior to entering the sludge processing and struvite dewatering three-phase centrifuge decanter 116. Oil from the sludge processing and struvite dewatering three-phase centrifuge decanter 116 is collected and can be sold as biodiesel feedstock. When sludge processing and struvite dewatering three-phase centrifuge decanter 116 is used to process FOG and TSS scums and bottom sludge from the second flotation zone, the dry solids may be used to make organic fertilizer for agriculture.

In the alternative example, the floating scum and bottom sludge collected from the third flotation zone and stored in the struvite slurry tank 40 is transferred to the sludge processing and struvite dewatering three-phase centrifuge decanter 116 by, for instance, a pump. Once the batch is completed by the sludge processing and struvite dewatering three-phase centrifuge decanter 116, the dewatered dry cake passes through a rotary drum granulator 118 to make slow-release granular struvite fertilizer.

Figure 2:
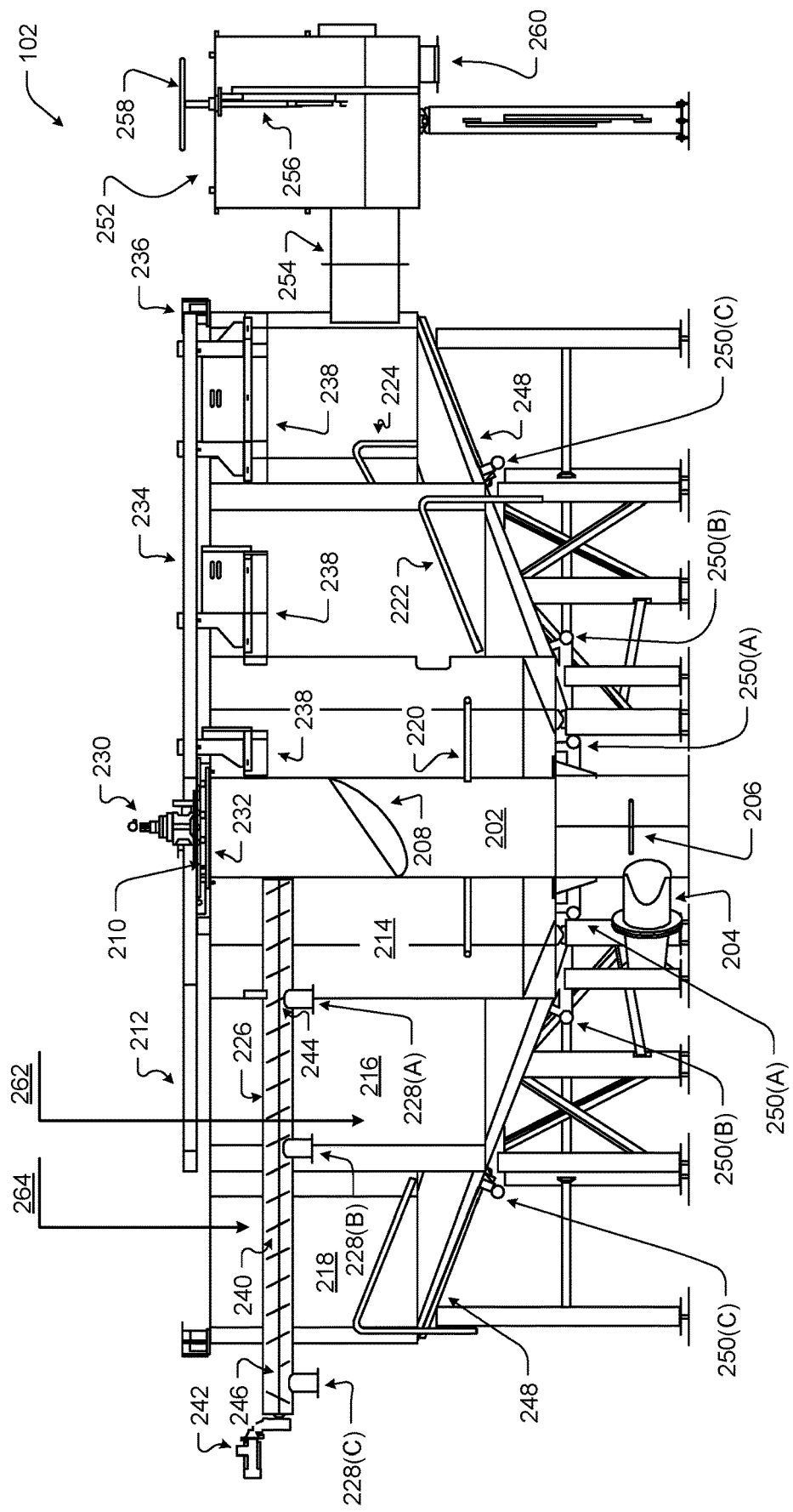
FIG. 2 illustrates a cross-sectional view of an example circular zoned dissolved air and/or ozone flotation unit of FIG. 1 according to some implementations.

FIG. 2 illustrates a cross-sectional view of the example circular zoned dissolved air and/or ozone flotation unit 102 of FIG. 1 according to some implementations. As discussed above, the raw wastewater is received by the CZDAOF system 102 at the central inlet column 202 via an inlet pipe 204. In some implementations, a mixture of dissolved air and/or ozone is introduced into the central column 202 via a diffuser 206 and mixes with the raw FOG-containing effluent. Upon release to the atmosphere, the dissolved air and/or ozone in the recirculated effluent generate numerous micro-size bubbles or microbubbles. The microbubbles attach on the surface of FOG and/or suspended solid particles and cause them to float upward. An angular guide plate 208 is mounted within the central inlet column 202 to change the flow direction and eliminate any FOG or particle accumulation on the surface of the central inlet column 202. Further, as illustrated, the central inlet column 202 may be exposed to the atmosphere, via at least openings 210 between a scum collection assembly 212 and a top surface of the central inlet column 202.

In one implementation, the central inlet column 202 may be sealed to prevent the formation of the micro-size bubbles in the received wastewater and/or recirculated effluent until the wastewater and/or the recirculated effluent including the dissolved gaseous material, such as air, ozone, chemicals, and/or other dissolved gaseous elements, is exposed to the atmosphere in the first flotation zone 214. In still other cases, the central inlet column 202 may receive the wastewater but not the recirculated effluent including the dissolved gaseous materials.

As the wastewater exits the central inlet column 202, the wastewater is processed via a series of flotation zones, such as flotation zones 214-218. In each of the flotation zones 214-218, additional microbubbles may be introduced to the wastewater to remove additional FOGs and solid particles via the respective diffuser 220-224. In some cases, the microbubbles attach to and raise the FOGs and solid particles to the surface of the wastewater. The scum collection assembly 212 then skims the surface of the wastewater to collect the floated FOGs and solid particles into a scum collection trough 226 and out via the discharge ports 228 (A)-(C). For example, the discharge port 228(A) may be in fluid communication with the recovered FOG tank 106 such that the FOG and particles collect in the first flotation zone 214 may be provided to the recovered FOG tank 106. The discharge port 228(B) may be in fluid communication with the sludge holding tank 108 such that the FOG and particles collect in the second flotation zone 216 may be provided to the sludge holding tank 108. The discharge port 228(C) may be in fluid communication with the struvite slurry tank 110 such that the FOG and particles collect in the third flotation zone 218 may be provided to the struvite slurry tank 110.

The scum collection assembly 212 may include a drive motor 230 configured to rotate a scum collection assembly 212. The drive motor 230 as well as the assembly 212 may be mounted on a central drive mounting pad 232. In the illustrated example, the scum collection assembly 212 also includes at least one scraper mounting arms 234, at least one corresponding side wall wheel assemblies 236, and one or more scum scrapers 238 mounted below the at least one scum scraper mounting arms 234. In general, as the scum collection assembly 212 is rotated by the drive motor 230, the assembly 212 rotates over flotation zones 214-218. In some cases, the drive motor 230 may be equipped with a variable frequency drive (VFD), such that the drive motor 230 may be operable at variable speeds. In other cases, the rotation of the scum collection assembly 232 may be parodic, such that the scum collection assembly 232 may rotate for a first predefined period of time and then halt for a second predefine period of time. In some cases, the scum collection assembly 232 may rotate in the clockwise direction. During the rotations, the scum scrapers 238 mounted below the scum scraper mounting arms 234 push the scum (e.g., the floated FOGs and solid particles) accumulated on the surface of the wastewater into the scum collection trough 226.

The scum collection trough 226 may include a screw convey unit 240 to push the FOGs and solid particles towards the discharge port 228(A)-(C). In some cases, a drive motor 242 may be mechanically coupled to the screw convey unit 240. The screw convey unit 240 may include one or more fin plates 244 coupled to a screw beam 246. In this example, the drive motor 242 may rotate the screw convey unit 240 to move the FOGs and solid particles deposited in the scum collection trough 226 towards the discharge port 228(A)-(C). The collected FOGs and solid particles may then be used or processed, such as when the FOGs include commercially desirable products, as discussed above with respect to FIG. 1.

In the illustrated example, the bottom plate of each of the flotation zones 214-218 are sloped to collect bottom sludge and heavy particles that is include in the wastewater received via the inlet pipe 204. In each of the flotation zones 214-218 a bottom sludge assembly 248 is configured to with several sludge discharge ports 250(A)-(C) ports evenly spaced along the circumference of each of the flotation zones 214-218 to collect and discharge the heavy solids and sludge that accumulates on the bottom of each flotation zone 214-218, as discussed above. For example, the bottom plate of each flotation zone 214-218 may be sloped toward the inner zone wall to help heavy solid particles slide toward the sludge discharge ports 250(A)-(C). In one implementation, the bottom sludge discharge assembly 248 consists of a number of sludge discharge ports 250(A)-(C) and a circular sludge pipe manifold (not shown). In some implementations, each flotation zone 214-218 may have a separate bottom sludge collection assembly 250(A)-(C), as illustrated. For instance, the sludge discharge ports 250(A) may be in fluid communication with the recovered FOG tank 106 such that the solid scum and heavy particles collected in the first flotation zone 214 may be provided to the recovered FOG tank 106. The sludge discharge ports 250(B) may be in fluid communication with the sludge holding tank 108 such that the solid scum and heavy particles collect in the second flotation zone 216 may be provided to the sludge holding tank 108. The sludge discharge ports 250(C) may be in fluid communication with the struvite slurry tank 110 such that the solid scum and heavy particles collected in the third flotation zone 218 may be provided to the struvite slurry tank 110.

In the current example, the CZDAOF unit 102 may include an effluent weir tank 252. For instance, the third flotation zone 218 may be in fluid communication with the effluent weir tank 252 via a channel 254, such that the cleaned effluent exiting the third flotation zone 218 enters the effluent weir tank 252. The effluent weir tank 252 may include a weir gate 256 that is adjustable via a handwheel 258 to control the effluent level in the weir tank 252. The treated effluent passes through an opening in the weir gate and is discharged through a discharge port 260 which may discharge the effluent at a city sewer system or in a lagoon and/or aeration pond.

In some cases, the FOG and colloidal particulates remaining in the wastewater after exiting the first flotation zone 214 are further agglomerated and flocculated to form larger particulates with the help of coagulant and flocculant 262 added to the wastewater in the second flotation zone 216. In some cases, the wastewater exiting the second flotation zone 216 may be used to from struvite. Thus, in the third flotation zone 218 magnesium chloride 264 may be added to precipitate phosphorus and from the struvite particulates.

Figure 3:
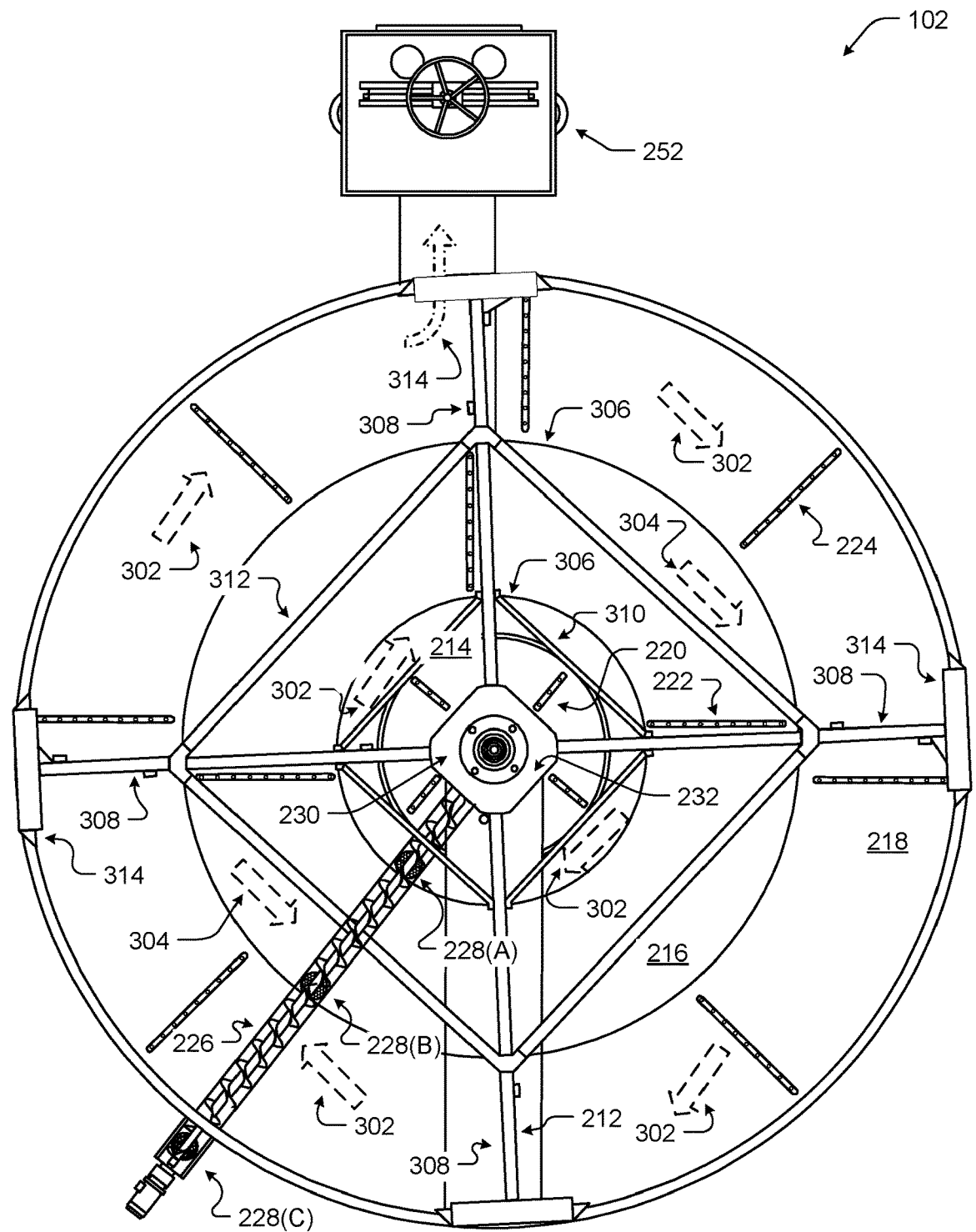
FIG. 3 illustrates another top view of the example circular zoned dissolved air and/or ozone flotation unit of FIG. 1 according to some implementations.

FIG. 3 illustrates another top view of the example circular zoned dissolved air and/or ozone flotation unit 102 of FIG. 1 according to some implementations. As discussed above in FIG. 2, the CZDAOF unit 102 may include a central inlet column (not shown) and a series of flotation zones, such as flotation zones 214-218, arranged about the central inlet column.

In the current example, the wastewater is received from a source at the lower or bottom portion of the central inlet column. The source of the wastewater may be from a food processing plant, such as a slaughter house or poultry processing facility. In the current example, a scum collection assembly 212 is shown positioned over the CZDAOF unit 102. The scum collection assembly 212 may be configured to skim FOGs and solid particles from the surface of the wastewater within each of the flotation zones 214-216 and deposit the FOG and solid particles into the scum collection trough 226. The scum collection trough 226 may then push the collected FOG and solid particles out of the CZDAOF unit 102 via one or more discharge ports, generally indicated by 228(A)-(C). For example, the scum collection trough 226 may discharge FOG and solid particles from the first flotation zone 214 via discharge port 228(A), FOG and solid particles from the second flotation zone 216 via discharge port 228(B), and FOG and solid particles from the third flotation zone 218 via discharge port 228(C).

The scum collection assembly 212 may include a drive motor 230 configured to rotate a scum collection assembly 212. The drive motor 230 as well as the assembly 212 may be mounted on a central drive mounting pad 232. In the illustrated example, the scum collection assembly 212 also includes four scraper mounting arras, generally indicated by 308, four inner structural beams, generally indicated by 310, four outer structural beams, generally indicated by 312, four side wall wheel assemblies, generally indicated by 314, and a scum scraper (not shown) coupled to each of the scum scraper mounting arms 234. While the illustrated example has four scarper mounting arms 308, four inner structural beams 310, and four outer structural beams 312, it should be understood that in other implementations, different numbers of scarper mounting arms 308, inner structural beams 310, and outer structural beams 312 may be used, such as two or six.

In general, as the scum collection assembly 232 is rotated by the drive motor 230, the assembly 232 rotates over flotation zones 214-218 via the four side wall wheel assemblies 314. During the rotations, the scum scrapers mounted below the scum scraper mounting arms 308 push the scum (e.g., the floated FOGs and solid particles) accumulated on the surface of the wastewater into the scum collection trough 226. For example, as the scum collection assembly 232 rotates one or more scum scrapers within each of the flotation zones 214-218 may be positioned to push the FOGs and solid particles floated by the microbubbles into the scum collection trough 226.

As discussed above, the central inlet column 102 and/or one or more of the flotation zones 214-218 may include diffusers, such as illustrated diffusers 220-224, to introduce fluid having dissolved air, gases, and/or ozone that produce microbubbles when exposed to the atmosphere after exiting the diffusers.

Once the wastewater has passed up and through the central column, the wastewater may enter the first flotation zone 214. In the current example, the first flotation zone 214 extends radially around the central column and is in fluid communication with the central column. The floated FOG and particles within the first flotation zone 214 are collected in the scum collection trough 226 and may be discharged via the discharge port 228(B) and then provided to the recovered FOG tank 106. In some cases, other than dissolved air and/or ozone no other additives may be introduced to the wastewater within the first flotation zone 214.

A second flotation zone 216 extends radially outward around the first flotation zone 214 and is configured in fluid communication with the first flotation zone 214, such that when the wastewater exits the first flotation zone 214, the wastewater enters the second flotation zone 216. In various implementations, the CZDAOF unit 102 may be configured with baffles that allow the wastewater within the flotation zones 214-218 to flow in different directions, as illustrated by the arrows 302 and 304. For instance, in some examples, the baffles may be configured such that the wastewater within the first flotation zone 214 flows in a first direction, generally indicated by 302, opposite a second direction, generally indicated by 304, to the wastewater within the second flotation zone 216. For instance, in the illustrated example, the wastewater in the first flotation zone 214 flows in a clockwise direction while the wastewater in the second flotation zone 216 flows in a counter-clockwise direction. Alternately, the wastewater in the first flotation zone 214 flows in a counter-clockwise direction while the wastewater in the second flotation zone 216 flows in a clockwise direction. By changing the direction of flow of the wastewater using baffles within each flotation zone 214-218, the CZDAOF unit 102 can slow the rate of flow of the wastewater and, thereby, increase the time the wastewater is within each flotation zone 214-218 and in the overall CZDAOF unit 102. The increased time within the CZDAOF unit 102 results in an increase in the amount of FOGs and solid particles that may be removed from the resulting effluent produced by the CZDAOF unit 102, as more particles are floated and removed via the scum collection trough 226, as discussed above with respect to FIG. 2.

Within the second flotation zone 216 coagulant and flocculant may be introduced into the wastewater. Thus, the remaining FOG and colloidal particulates remaining in the wastewater after the wastewater exits the first flotation zone 214 are further agglomerated and flocculated to form larger particulates with the help of coagulant and flocculant. In some examples, substantial portion of particulate and colloidal organic matter and suspended solids may be removed from the wastewater by the second flotation zone 216. Additionally, in the second flotation zone 216 the BOD and TSS loadings in the wastewater are also significantly reduced. The floated FOG and particles are collected in the scum collection trough 226 from the second flotation zone 216 and may be discharged via the discharge port 228(B) and then provided to the sludge holding tank 108.

In the illustrated example, a third flotation zone 218 extends radially outward around the second flotation zone 216 and is configured in fluid communication with the second flotation zone 216, such that when the wastewater exits the second flotation zone 216, the wastewater enters the third flotation zone 218. The CZDAOF unit 102 is further configured such that the wastewater within the third flotation zone 218 flows in the first direction 302 opposite the second direction 304 of the wastewater within the second flotation zone 216 (e.g., the wastewater in the third flotation zone 218 flows in the same direction as the wastewater within the first flotation zone 214). Again, by changing the direction of flow of the wastewater within each flotation zone 214-218, the CZDAOF unit 102 is able to slow the rate of flow of the wastewater and, thereby, increase the amount of FOGs and solid particles that may be removed from the resulting effluent produced by the CZDAOF unit 102.

Within the third flotation zone 218, magnesium chloride may be added to the wastewater to precipitate phosphorus and form struvite particulates, as discussed above. The floated FOG and particles are collected in the scum collection trough 226 from the third flotation zone 218 may be discharged via the discharge port 228(C) and then provided to the struvite slurry tank 110.

In the current example, the wastewater is shown as flowing out of the third flotation zone 218, generally indicated by 314 into an effluent reservoir or weir tank 252. Thus, the third flotation zone 218 and the weir tank 252 are in fluid communication. For example, as the CZDAOF unit 102 removes the FOGs and solid particles from the wastewater, the wastewater is cleaned, and disposable or reusable effluent is produced as the wastewater exits the third flotation zone 218 and enters the weir tank 252.

In the various implementations discussed herein, the relative sizes of each of the flotation zones 214-218 may vary and may be determined based on process requirements of the wastewater. In some cases, the flotation zones 214-218 may be separated by vertical zone walls 306 that are arranged in concentric configuration.

In the current example, the CZDAOF unit 102 may be configured to be fabricated using 304L or 316L, stainless steel, or a series of duplex stainless. For instance, stainless steel does not need to be painted or coated in some manner, and therefore can be more economical. Further, the circular shape of the CZDAOF unit 102 allows the side zone walls to be in hoop stress, enabling the CZDAOF unit 102 to be built to almost any diameter using lighter, thinner materials than conventional rectangular CZDAOF units. Additionally, to address potential shipping problems due to size, the CZDAOF unit 102 may be fabricated in a number of flanged sections or modules that can be easily transported in pieces and assembled at the construction site. This allows the CZDAOF unit 102 to be of any desired diameter to be built and shipped to meet the requirements of the project at hand, and also reduces transportation costs when compared to conventional units.

Figure 4:
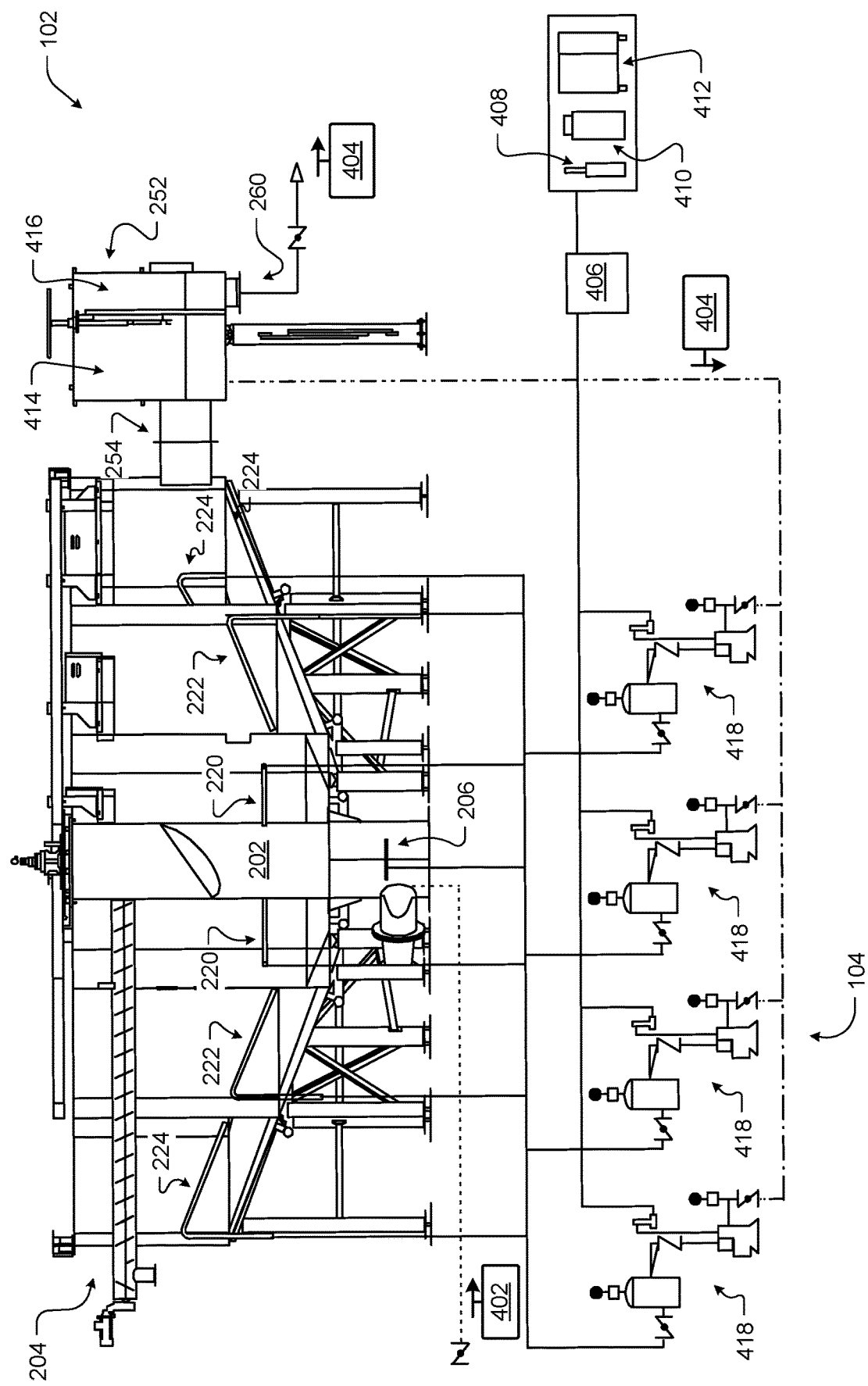
FIG. 4 illustrates a partial view of an example resource recovery system of FIG. 1 according to some implementations.

FIG. 4 illustrates a partial view of an example resource recovery system 100 of FIG. 1 according to some implementations. As discussed above, wastewater 402 enters the CZDAOF unit 102 via an inlet pipe 204 coupled to the central inlet column 202. Likewise, the cleaned effluent 404 exits the CZDAOF unit 102 via a channel 252 and into an effluent weir tank 252. In some implementations, some portion of the cleaned effluent 404 may be recirculated to the gaseous material dissolving system 104, as shown. In the illustrated example, the gaseous material dissolving system 104 includes an ozone generator 406, oxygen generator 408, chiller 410, air compressor 412, and one or more microbubble generators 418. The gaseous material dissolving system 104 may draw cleaned effluent 404 from the fill chamber 414 of the weir tank 252. The weir tank 252 may include an adjustable weir gate that controls the water level in the CZDAOF system 102. When this filling chamber 414 is full (e.g., more cleaned effluent 404 is in the filling chamber 414 than the gaseous material dissolving system 104 may consume), the excess cleaned effluent 404 overflows the adjustable weir into the outfall chamber 416 and is discharged through a discharge port 260 and may then be provided to a city sewer system or lagoon and/or aeration pond via the discharge port 260.

In general, the microbubble generators 418 may cause the air, ozone and/or other gases (e.g., nitrogen) to be dissolved into the cleaned effluent 404 under high pressure. The cleaned effluent 404 including the dissolved gases may then be provided via fluid communication to corresponding dissolved air diffuser, such as diffusers 206, 220, 222, and 224.

In the illustrated example, each of the microbubble generators 418 are in fluid communication with each of the central inlet column 202 and the flotation zones 214-218. However, in alternative implementations, each of the microbubble generators 418 may dissolve gases into cleaned effluent 404 being supplied to select ones of the diffusers 206, 220, 222, or 224, such as when different gases are dissolved for use in different flotation zones 214-218.

Figure 5:
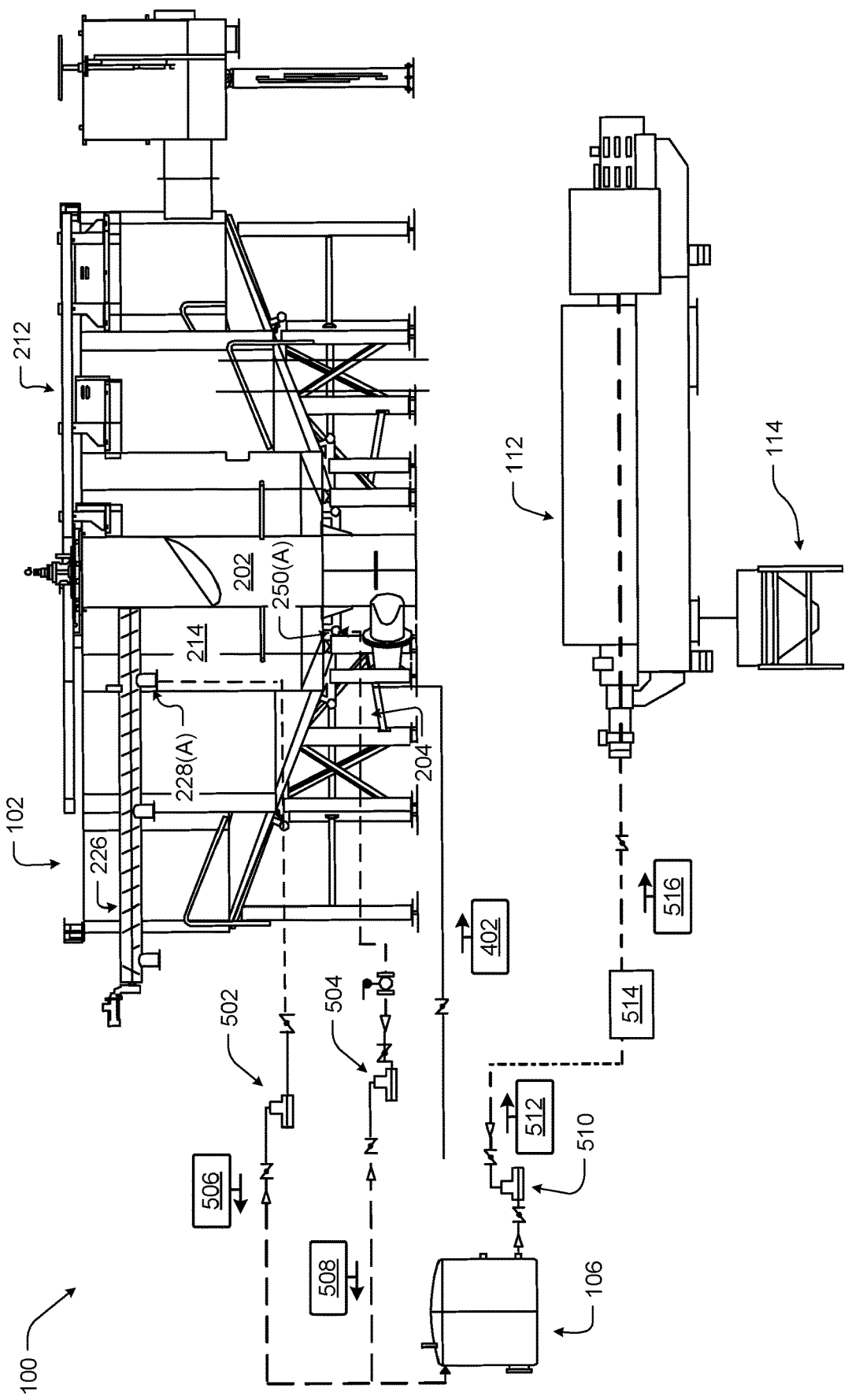
FIG. 5 illustrates another partial view of an example resource recovery system of FIG. 1 according to some implementations.

FIG. 5 illustrates another partial view of an example resource recovery system 100 of FIG. 1 according to some implementations. In the current example, the raw poultry wastewater 402 enters the CZDAOF system 102 via the central inlet column 202. The wastewater 402 may then exit the central inlet column 202 and enter the first flotation zone 214. In the central inlet column 202 and the first flotation zone 214, the wastewater may be exposed to dissolved air and/or ozone but no chemicals or other additives may be introduced into the wastewater 402. When the dissolved air and/or ozone is exposed to the atmosphere in the first flotation zone 214, microbubbles may be formed that attach to the FOG and tend to cause the FOG to buoy up to the surface because of the FOG's lower density. In some cases, the dissolved air and/or ozone may be evenly distributed in the first flotation zone 214. The floated FOG and other floated solid particles may then be collected the scum scraper assembly 212 and the scum collection trough 226, as discussed above. The floated FOG and other floated solid particles (e.g., surface scum) collected in the scum collection trough 226, may then be discharged via the discharge port 228(A). In some cases, the floated FOG and other floated solid particles (e.g., surface scum) 506 collected in the first flotation zone 214 is transferred into a recovered FOG tank 106 by a pump 502. The chicken parts and particulates 508 that settle to the bottom of first flotation zone 214 are discharged through a bottom sludge discharge assembly 250(A) and are transferred to the recovered FOG tank 106 by a pump 504. In some cases, the addition of ozone may assist in increasing FOG recovery efficiency and control odors from the system 100.

The recovered FOG from the surface of first flotation zone 214 and the settled heavy chicken particulates are preheated in recovered FOG tank 106. A pump 510 transfers the heated recovered FOG and small particulates 512 through a constant flow steam heater 514. For example, steam may be injected to further heat the FOG and small particulates 512 to a desired operation temperature or temperature range. The steamed and heated FOG and small particulates 516 flow into a three-phase centrifuge decanter 112. The three-phase centrifuge decanter 112 may be used to separate oil, liquid, and solid particles from the FOG and small particulates 516. The recovered oil from the three-phase centrifuge decanter 112 can be reserved or sold for yellow grease production. It has been found that the yellow grease produce by the system 100 can be stored for much longer periods at room temperature without deterioration than yellow grease produced by conventional systems.

Figure 6:
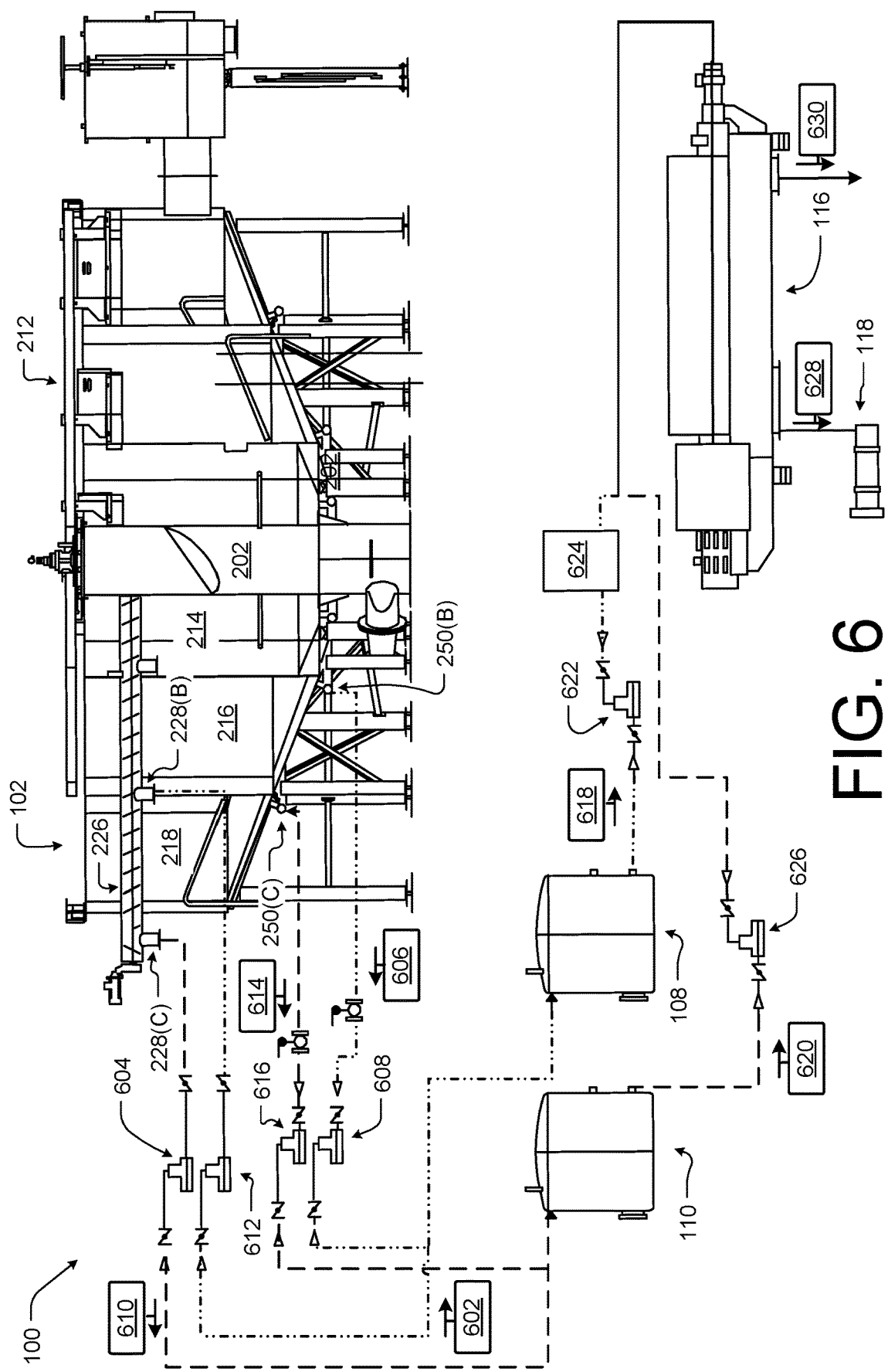
FIG. 6 illustrates another partial view of an example resource recovery system of FIG. 1 according to some implementations.

FIG. 6 illustrates another partial view of an example resource recovery system 100 of FIG. 1 according to some implementations. In the current example, the wastewater 402 has passed out of the first flotation zone 214 and into the second flotation zone 216. In the flotation zone 216 coagulant and flocculant are introduced to the wastewater 402. The remaining FOG and colloidal particulates from the first flotation zone 214 are further agglomerated and flocculated within the second flotation zone 216 to form larger particulates with the help of coagulant and flocculant. In the second flotation zone 216, substantial portions of particulate and colloidal organic matter and suspended solids are removed and the BOD and TSS loadings in the second flotation zone 216 wastewater are also significantly reduced.

In some examples, dissolved air and/or ozone are evenly distributed in the second flotation zone 216 through a series of diffusers as discussed above. The collected floating scum 602 in the second zone 216 are moved into the scum collection trough 226 by the scum collection assembly 212. The floating scum 602 is transferred into a sludge holding tank 108 by a transfer pump 612 coupled to the discharge port 228(B). The heavier solids settle 606 to the bottom of second flotation zone 216 and are discharged through a bottom sludge discharge port 250(B) before being transferred to the sludge holding tank 108 by a pump 608.

In the third flotation zone 218, magnesium chloride is added to precipitate phosphorus and form struvite particulates, as discussed above. Again, within the third flotation zone 218, dissolved air and ozone may be evenly distributed through a series of diffusers. Again, the floating scum 610 in the third zone 218 may be moved into the scum collection trough 226 by the scum collection assembly 212. The collected floating scum 610 from the third flotation zone 218 is then transferred into the struvite slurry tank 110 by a transfer pump 604 coupled to the discharge port 228(C). The heavier solids 614 in the third flotation zone 218 settle to the bottom and are discharged through bottom sludge discharge port 250(C). The heavier solids 614 from the third flotation zone 218 may then be transferred to the struvite slurry tank 110 by a pump 616.

The three-phase centrifuge decanter 116 can be run on a batch basis for both sludge 618 dewatering and struvite slurry 620 dewatering. For example, the three-phase centrifuge decanter 116 can process FOG and sludge collected from the second flotation zone 216 in one batch and process the struvite slurry 620 collected from the third flotation zone 218 in a second batch. The sludge 618 from the second flotation zone 216 are stored and preheated in a sludge holding tank 108. The heated sludge 218 may then be transferred by a pump 622 through a constant-flow steam heater 624. Oil produced from the sludge 618 by the three-phase centrifuge decanter 116 is collected and can be sold or used as biodiesel feedstock 630. In some specific implementations, the three-phase centrifuge decanter 112 is used to process the sludge 618 from the second flotation zone 216, and a dry solid can be produced that may be used as an input to organic fertilizer for agriculture.

The floating scum and bottom sludge 620 collected from the third flotation zone 218 and stored in the struvite slurry tank 110 may be transferred to the three-phase centrifuge decanter 116 by a pump 626. In some implementations, no steam or heat is introduced when three-phase centrifuge decanter 116 is processing struvite slurry 620. The dewatered dry cake 628 produced by the three-phase centrifuge decanter 116 processing of the struvite slurry 620 is passed through a rotary drum granulator 118 to make slow-release granular struvite fertilizer.

Figure 7:
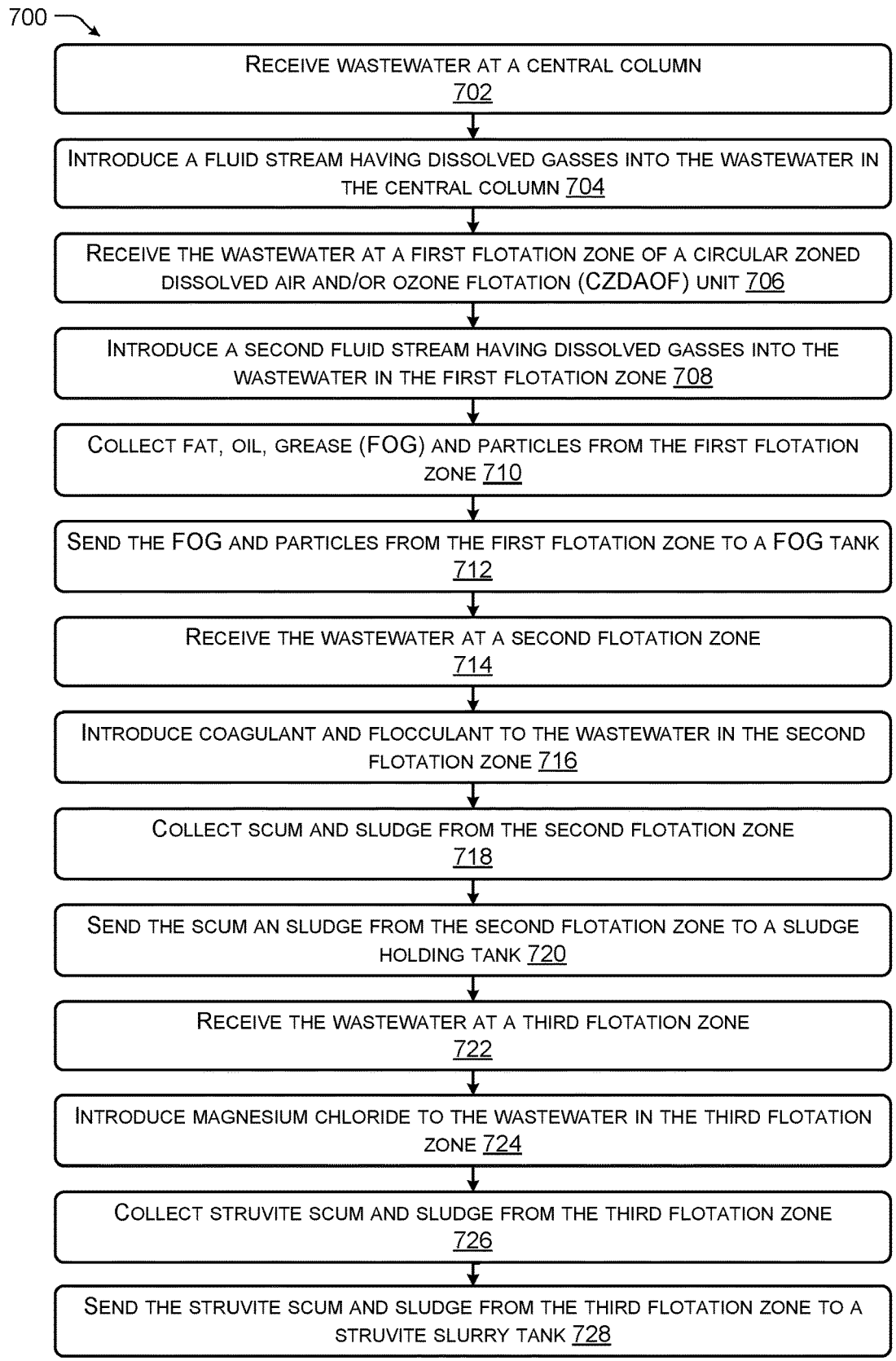
FIG. 7 illustrates an example flow diagram showing a process for separating wastewater by-products according to some implementations.
Figure 8:
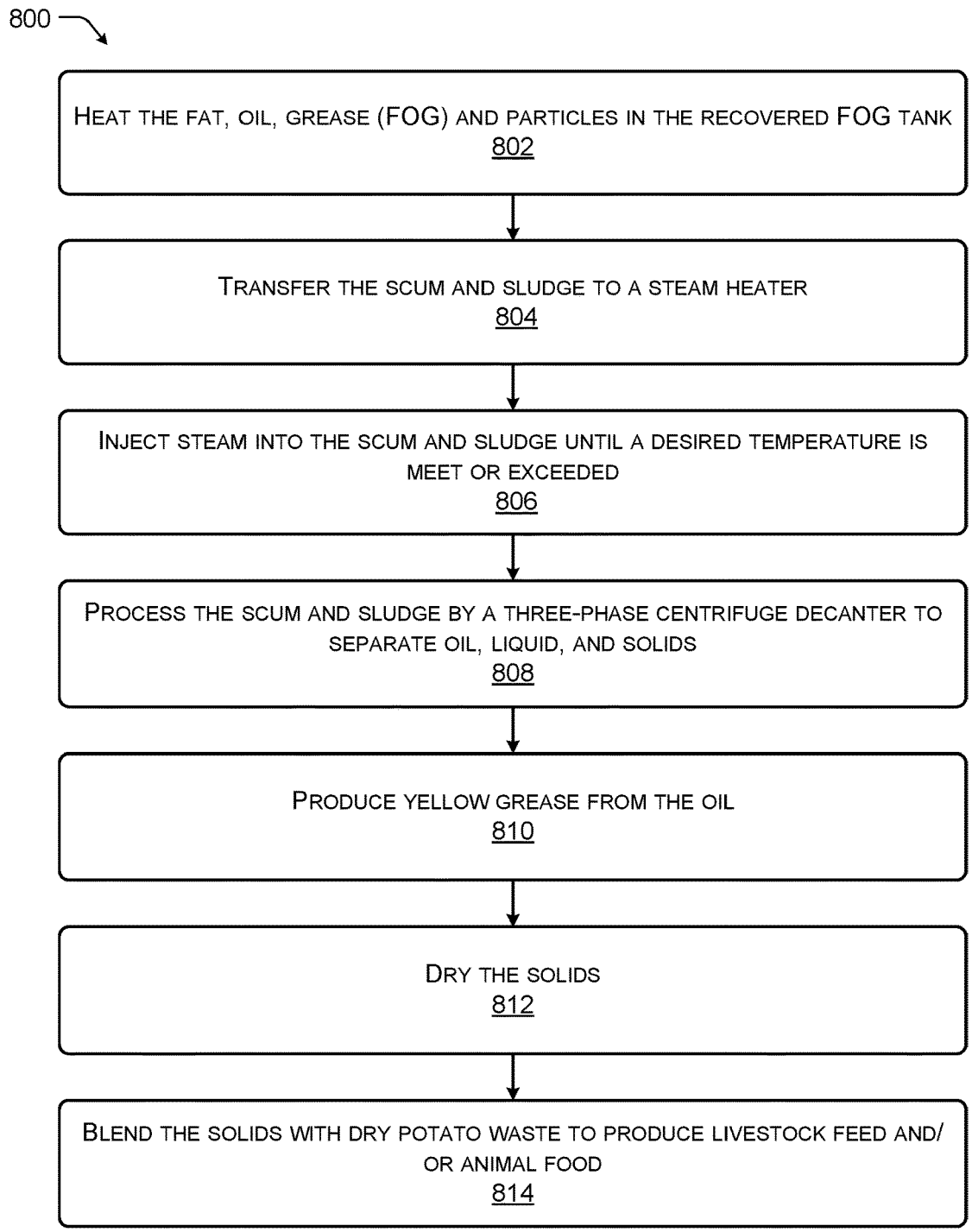
FIG. 8 illustrates an example flow diagram showing a process for forming yellow grease according to some implementations.
Figure 9:
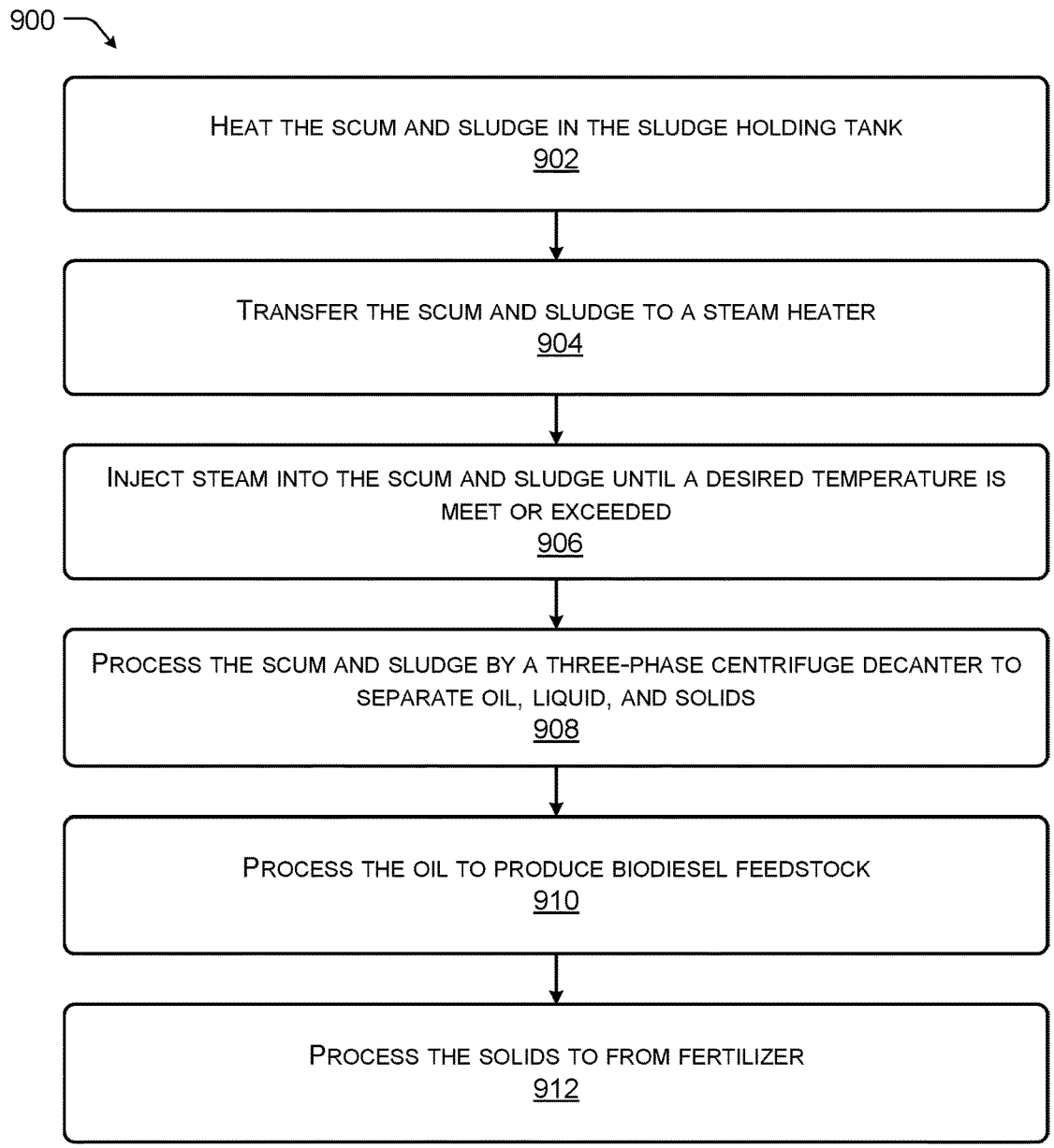
FIG. 9 illustrates an example flow diagram showing a process for forming Biodiesel Feedstocks and fertilizer and bio according to some implementations.

FIGS. 7-9 are flow diagrams illustrating example processes associated with the resource recovery system according to some implementations. The processes are illustrated as a collection of blocks in a logical flow diagram, which represent a sequence of operations, some or all of which can be implemented in hardware, software or a combination thereof. The order in which the operations are described should not be construed as a limitation. Any number of the described blocks can be combined in any order and/or in parallel to implement the process, or alternative processes, and not all of the blocks need be executed.

FIG. 7 illustrates an example flow diagram showing a process 700 for separating wastewater by-products according to some implementations. As discussed above, a circular zoned dissolved air and/or ozone flotation (CZDAOF) unit may be used to separate by-products of wastewater produced, for instance, by a poultry processing facility.

At 702, the CZDAOF unit may receive wastewater via a central inlet column. For example, the wastewater may be received via an inlet pipe in fluid communication with the poultry processing facility.

At 704, the CZDAOF unit may introduce a stream of fluid having dissolved gasses into the wastewater via one or more diffusers. In some cases, the central column may be open to the atmosphere in which case the dissolved gasses form microbubbles that may attached and float FOG to the surface for collection. In other cases, the central column may be closed to the atmosphere to keep the gasses dissolved.

At 706, the wastewater may enter a first flotation zone of the CZDAOF unit. In the first flotation zone no chemicals may be added to the wastewater to maintain the integrity of the FOG particles in the wastewater.

At 708, the CZDAOF unit may introduce a stream of fluid having dissolved gasses into the wastewater via one or more diffusers. The first flotation zone is exposed to the atmosphere to cause the dissolved gasses to form microbubbles that may attached and float FOG to the surface for collection.

At 710, the FOG and particles floated by the microbubbles may be collected from the surface and the heavy particles, such as whole poultry parts may be collected from the bottom of the first flotation zone.

At 712, the collected FOG and particles are provided to a FOG tank for storage. In some cases, the collected FOG may be used to produce yellow grease and other products.

At 714, the wastewater is received at a second flotation zone of the CZDAOF unit. In some cases, the direction of flow of the wastewater in the second flotation zone may be reversed from the direction of flow within the first flotation zone to slow the movement of the wastewater and allow the wastewater to reaming in the CZDAOF unit for a longer period of time.

At 716, coagulant and flocculant are added to the wastewater within the second flotation zone. The coagulant and flocculant may be added to enhance the BOD and TSS removal. For example, by adjusting and altering the amount of chemical additions in the form of the coagulants and flocculants, the BOD in the effluent discharged by the system can be reduced by as much as 50-60 percent and the TSS in the effluent discharged by the system may be reduced by as much as 90-95 percent.

At 718, scum on the surface of the wastewater and bottom sludge on the bottom of the second flotation zone are collected, and at 720, the collected scum and sludge are stored in designated chemical contaminated sludge holding tank. For example, the collected scum and sludge may be used to make biodiesel feedstock.

At 722, the wastewater is received at a third flotation zone of the CZDAOF unit. In some cases, the direction of flow of the wastewater in the third flotation zone may be again reversed from the direction of flow within the second flotation zone to again slow the movement of the wastewater and allow the wastewater to reaming in the CZDAOF unit for a longer period of time.

At 724, magnesium chloride is introduced to the wastewater in the third flotation zone. The magnesium chloride is added to precipitate phosphorus and to produce struvite.

At 726, the struvite scum and sludge is collect from the third flotation zone. For example, the struvite is not soluble in water and, thus, may be more easily collected. The collected struvite may then be used or sold as, for instance, a slow-release fertilizer.

At 728, the collected struvite scum and sludge is provided to a struvite slurry tank where it may be stored prior to being used to produce the slow-release fertilizer FIG. 8 illustrates an example flow diagram showing a process 800 for forming yellow grease according to some implementations. As discussed above with respect to FIG. 7, FOG may be collected in the recovered FOG tank. The recovered FOG may then be used to produce products, such as yellow grease.

At 802, the FOG and particles in the recovered FOG tank may be heated over time. For example, the FOG and particles may be maintained in the recovered FOG tank for a predefined period of time or until a first desired temperature is meet or exceeded.

At 804, the FOG and particles are transferred to a steam heater and, at 806, the steam heater may introduce steam to the FOG and particles until the FOG and particles meet or exceed a second desired temperature. In some cases, the desired temperature may be temperature range.

At 808, the FOG and particles by a three-phase centrifuge decanter to separate oil, liquid, and solids and, at 810, the oil may then be used to produce yellow grease.

At 812, the system may dry the solids and, at 814, the dried solids may be blended with dry potato waste to produce livestock feed and/or animal food.

FIG. 9 illustrates an example flow diagram showing a process 900 for forming Biodiesel Feedstocks and fertilizer and bio according to some implementations. As discussed above with respect to FIG. 7, scum and sludge may be collected in the sludge holding tank. The recovered scum and sludge may then be used to produce products, such as feedstock.

At 902, scum and sludge in the sludge holding tank may be heated over time. For example, the scum and sludge may be maintained in the sludge holding tank for a predefined period of time or until a first desired temperature is meet or exceeded.

At 904, the scum and sludge are transferred to a steam heater, and at 906, the steam heater may introduce steam to the scum and sludge until the scum and sludge meet or exceed a second desired temperature. In some cases, the desired temperature may be temperature range.

At 908, the process the scum and sludge by a three-phase centrifuge decanter to separate oil, liquid, and solids and, at 910, the oil may then be used to biodiesel feedstock. At 912, the solids may be used to produce fertilizer.

FIG. 10 illustrates an example flow diagram showing a process 1000 for forming struvite fertilizer according to some implementations. As discussed above with respect to FIG. 7, struvite scum and sludge may be collected in the struvite slurry tank. The struvite scum and sludge may then be used to produce products, such as struvite slow-release fertilizer.

At 1002, the struvite scum and sludge may be transferred to a three-phase centrifuge decanter and, at 1004, the three-phase centrifuge decanter may process the struvite scum to separate the struvite scum and sludge into oil, liquid, and solids.

At 1006, the solids may be transferred to a rotary drum granulator to produce slow-release granular struvite fertilizer.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a zoned dissolved gases flotation unit having a first flotation zone in fluid communication with a second flotation zone, and a third flotation zone in fluid communication with the second flotation zone;
   a fat, oil and grease (FOG) tank coupled to the first flotation zone to receive FOG and other particles collected from effluent within the first flotation zone;
   a sludge holding tank coupled to the second flotation zone to receive scum and sludge collected from the effluent within the second flotation zone;
   a struvite slurry tank coupled to the third flotation zone to receive struvite scum and sludge collected from the effluent within the third flotation zone; and
   a gaseous material dissolving system in fluid communication with at least one of the first flotation zone, the second flotation zone, and the third flotation zone, the gaseous material dissolving system to dissolve gases into a fluid stream mixed with the effluent.

2. The system as recited in claim 1, wherein the gaseous material dissolving system is in fluid communication with the first flotation zone, the second flotation zone, and the third flotation zone.

3. The system as recited in claim 1, wherein coagulant is introduced to the effluent in the second flotation zone.

4. The system as recited in claim 1, wherein flocculant is introduced to the effluent in the second flotation zone.

5. The system as recited in claim 1, wherein magnesium chloride is introduced to the effluent in the third flotation zone.

6. The system as recited in claim 1, further comprising a three-phase centrifuge decanter in fluid communication with the FOG tank.

7. The system as recited in claim 1, further comprising a three-phase centrifuge decanter in fluid communication with sludge holding tank and the struvite slurry tank.

8. The system as recited in claim 1, further comprising an effluent weir tank in fluid communication with the third flotation zone and the gaseous material dissolving system such that the fluid stream includes at least a portion of cleaned effluent stored in the weir tank.

9. The system as recited in claim 1, wherein the zoned dissolved gases flotation unit is a circular zoned dissolved air and/or ozone flotation unit.

10. A dissolved air and/or ozone flotation unit comprising:
    a central column in fluid communication with an inlet pipe for receiving wastewater;
    a first flotation zone in fluid communication with the central column, the first flotation zone including at least one diffuser to mix a first fluid stream having dissolved gases into the wastewater;
    a second flotation zone in fluid communication with the first flotation zone, the second flotation zone including at least one diffuser to mix a second fluid stream having dissolved gases into the wastewater and wherein coagulant and flocculant are introduced to the wastewater within the second flotation zone; and
    a third flotation zone in fluid communication with the second flotation zone, the third flotation zone including at least one diffuser to mix a third fluid stream having dissolved gases into the wastewater and wherein magnesium chloride is introduced to the wastewater within the second flotation zone.

11. The dissolved air and/or ozone flotation unit as recited in claim 10, further comprising a scum collection trough to collect floated particles from the wastewater, the scum collection trough including:
    a first discharge port coupled to a fat, oil and grease (FOG) tank and configured to transfer floated particles within the first flotation zone to the FOG tank;
    a second discharge port coupled to a sludge holding tank and configured to transfer floated particles within the second flotation zone to the sludge holding tank;
    a third discharge port coupled to a struvite slurry tank and configured to transfer floated particles within the third flotation zone to the struvite slurry tank; and
    a screw conveyor to move the floated particles within the scum collection trough.

12. The dissolved air and/or ozone flotation unit as recited in claim 11, further comprising a scum scraper assembly mounted over the dissolved air and/or ozone flotation unit, the scum scraper assembly including:
    a drive motor for rotating the scum scraper assembly;
    at least one scraper mounting arm; and
    at least one scraper mounted to the bottom of the mounting arm, the at least one scraper to push the floated particles on a surface of the wastewater into the scum collection trough.

13. The dissolved air and/or ozone flotation unit as recited in claim 10, wherein the dissolved gases in the first fluid stream include at least one of air or ozone.

14. The dissolved air and/or ozone flotation unit as recited in claim 10, wherein the diffusers within the first flotation zone, second flotation zone, and third flotation zone are evenly distributed.

15. The dissolved air and/or ozone flotation unit as recited in claim 10, further comprising a sludge collection assembly, the sludge collection assembly including:
    a first sludge discharge ports coupled to a fat, oil and grease (FOG) tank and configured to transfer heavy particles settling on a bottom of the first flotation zone to the FOG tank;
    a second sludge discharge ports coupled to a sludge holding tank and configured to transfer sludge settling on a bottom of the second flotation zone to the sludge holding tank; and
    a third sludge discharge ports coupled to a struvite slurry tank and configured to transfer struvite sludge on a bottom of the third flotation zone to the struvite slurry tank.

16. The dissolved air and/or ozone flotation unit as recited in claim 10, wherein the dissolved air and/or ozone flotation unit is a circular zoned dissolved air and/or ozone flotation unit.

17. A method comprising:
    introducing a first fluid stream having dissolved air or ozone into wastewater within a first flotation zone of a circular zoned dissolved air and/or ozone flotation (CZDAOF) unit;
    introducing a second fluid stream having dissolved air or ozone into wastewater within a second flotation zone of the CZDAOF unit;
    introducing at least one of coagulant and flocculant into wastewater within the second flotation zone of the CZDAOF unit;

introducing a third fluid stream having dissolved air or ozone into wastewater within a third flotation zone of the CZDAOF unit;
introducing magnesium chloride into wastewater within the third flotation zone of the CZDAOF unit;
collecting fat, oil and grease (FOG) from a surface of the wastewater in the first flotation zone;
collecting solid particles from a bottom surface of the first flotation zone;
transferring the FOG and the solid particles to a FOG tank;
collecting scum from a surface of the wastewater in the second flotation zone;
collecting sludge from a bottom surface of the second flotation zone;
transferring the scum and sludge to a sludge holding tank;
collecting struvite scum from a surface of the wastewater in the third flotation zone;
collecting struvite sludge from a bottom surface of the third flotation zone; and
transferring the struvite scum and struvite sludge to a FOG tank.

18. The method as recited in claim 17, further comprising:
heating the FOG and the solid particles within the FOG tank till the FOG and the solid particles reach a first desired temperature;
applying steam to the FOG and the solid particles by a steam heater till the FOG and the solid particles reach a second desired temperature;
processing the FOG and the solid particles using a three-phase centrifuge decanter to separate the FOG and the solid particles into an oil portion, a liquid portion, and a solid portion;
processing the oil portion to produce yellow grease; and
blending the solid portion with potato waste to produce animal feed.

19. The method as recited in claim 17, further comprising:
heating the scum and sludge within the sludge holding tank till the scum and sludge reach a first desired temperature;
applying steam to the scum and sludge by a steam heater till the scum and sludge reach a second desired temperature;
processing the scum and sludge using a three-phase centrifuge decanter to separate the scum and sludge into an oil portion, a liquid portion, and a solid portion;
processing the oil portion to produce biodiesel feedstock; and
processing the solid portion to produce fertilizer.

20. The method as recited in claim 17, further comprising:
processing the struvite scum and struvite sludge using a three-phase centrifuge decanter to separate the struvite scum and struvite sludge into an oil portion, a liquid portion, and a solid portion;
processing the oil portion to produce biodiesel feedstock; and
processing the solid portion by a rotary drum granulator to produce struvite slow-release fertilizer.

* * * * *